United States Patent [19]
Kondo et al.

[11] 3,714,166
[45] Jan. 30, 1973

[54] COCARBOXYLASE ARGINATE AND PROCESS FOR THE PRODUCTION THEREOF

[75] Inventors: Seigo Kondo, Horinouchi, Suginami-ku, Tokyo; Toshikazu Tabata, Kohoku-ku, Yokohama-shi, Kanagawa-ken; Jiro Horiuchi, Sayama-shi, Saitama-ken, all of Japan

[73] Assignee: Kanto Ishiseiyaku Co., Ltd., Saitama-ken, Japan

[22] Filed: Oct. 26, 1970

[21] Appl. No.: 84,180

[30] Foreign Application Priority Data

Oct. 24, 1969  Japan ................................44/85114

[52] U.S. Cl...........260/256.5 B, 260/256.6, 424/255
[51] Int. Cl.............................................C07d 99/12
[58] Field of Search ....................260/256.5 B, 256.6

[56] References Cited

UNITED STATES PATENTS 3,432,504   3/1969   Goetze-Claren ..................260/256.6

FOREIGN PATENTS OR APPLICATIONS 683,178   3/1964   Canada..........................260/256.5 B Primary Examiner—Alex Mazel
Assistant Examiner—R. J. Gallagher
Attorney—Oblon, Fisher & Spivak

[57] ABSTRACT

A stable cocarboxylase arginate is prepared by reacting one mole of cocarboxylase with at least one mole of arginine or a salt thereof. The cocarboxylase arginate product may be recovered from the reaction mixture by conventional techniques, and has excellent moisture stability and an enhanced pharmaceutical activity.

1 Claim, No Drawings

COCARBOXYLASE ARGINATE AND PROCESS FOR THE PRODUCTION THEREOF

BACKGROUND OF THE INVENTION

1. Field of The Invention

This invention relates to a new chemical compound and a novel process for its preparation. More particularly, this invention relates to cocarboxylase arginate and a process for the preparation thereof by reacting cocarboxylase with arginine or a salt thereof, and crystallizing the resulting product.

2. Description Of The Prior Art

Thiamine pyrophosphate is a known co-enzyme which acts with carboxylase in the in vivo oxidative decarboxylation of $\alpha$-keto acids, such as in the decarboxylation of pyruvic acid into acetaldehyde and carbon dioxide. As such, thiamine pyrophosphate is often referred to as cocarboxylase, although it is also a necessary co-enzyme for the transketolation reactions which occur in the direct oxidative pathway of glucose metabolism.

Cocarboxylase has many clinical and experimental uses which are well known in the art. However, cocarboxylase is very unstable in the presence of moisture and loses its activity not only when stored in the form of an aqueous solution, but also when stored as a powder or tablet due to the adsorption of moisture during storage.

SUMMARY OF THE INVENTION

It is a principal object of this invention to provide a cocarboxylase arginate which is stable in the form of an aqueous solution.

Another object of this invention is to provide a cocarboxylase arginate which is stable in the form of a powder or tablet.

A further object of this invention is to provide a method of preparing a cocarboxylase arginate which will remain stable in the presence of moisture.

An additional object of this invention is to provide a cocarboxylase arginate having enhanced pharmaceutical activity.

Yet another object of this invention is to provide a cocarboxylase arginate having wide pharmaceutical applications.

Briefly, these and other objects are attained in one aspect of the present invention which provides a unique cocarboxylase arginate and simple methods for the preparation thereof. As a result of research conducted to solve the above-mentioned and other disadvantages of cocarboxylase, it has now been discovered that cocarboxylase arginate may be prepared by reacting cocarboxylase with arginine or its salts, and that the carboxylase arginate thus prepared is characterized by greatly improved moisture stability and enhanced biochemical properties.

DESCRIPTION OF AN ILLUSTRATIVE EMBODIMENT

According to the present invention, cocarboxylase arginate is prepared by reacting cocarboxylase with arginine or an arginine salt. Preferably a slight molar excess of arginine will be reacted with each mole of cocarboxylase in order to obtain a good yield.

In carrying out the reaction, a solvent which will dissolve both cocarboxylase and arginine is utilized, preferably using a minimum amount of solvent which will dissolve both the cocarboxylase and the arginine or arginine salt. Suitable solvents are aqueous solvents such as water or a mixture of water with an organic solvent, such as methanol, ethanol, glycol, glycerine or the like.

The reaction may be carried out at room temperature or, if desired, under gentle heating.

In order to separate and purify cocarboxylase arginate from the reaction mixture, conventional recovery methods may be utilized. One suitable method is to add a non-solvent for cocarboxylase arginate, such as ethanol, to the reaction mixture and collect the precipitate which crystallizes upon cooling. The collected precipitate may be dissolved in water, ethanol again added, and the mixture allowed to stand in a cold place so that cocarboxylase arginate will deposit and crystallize. Other suitable recovery methods will be apparent to those skilled in the art.

The following Example is illustrative of one suitable method by which the new compound of the present invention can be prepared.

EXAMPLE

Two-hundred g. of arginine is dissolved in 2,000 ml. of warm water, 493 g. of cocarboxylase is added to the solution, and the mixture is reacted at room temperature for 30 minutes. The reaction mixture is filtered, 4,000 ml. of ethanol is added to the filtrate, and the resulting mixture is stirred and allowed to stand in a cold place. 630 g. of precipitate is deposited. The precipitate is then dissolved in 200 ml. of warm water and filtered. 4,000 ml. of ethanol is added to the filtrate, and the mixture is allowed to stand in a cold place overnight to deposit colorless crystals. The crystals are collected by filtration and dried to obtain 500 g. (representing a 74.4 percent yield ) of cocarboxylase arginate melting at 110°–120° C. with decomposition.

While the detailed chemical structure of the thus-obtained cocarboxylase arginate is not yet known, it is believed to be a single compound in which one mole of cocarboxylase has reacted with one mole of arginine, as established from the infra-red and ultra-violet absorption spectra. Cocarboxylase arginate melts over a range of 110°–120°C. with decomposition, and is very stable, even in the presence of moisture.

The Table below sets forth the stability of cocarboxylase arginate as compared with a control of cocarboxylase. Each compound was dissolved in water to make a separate solution of 25 mg. per 10 ml., and stability data were obtained by allowing the solutions to stand at temperatures of 37°C., 45° C., and 60° C. for several months. Activity was measured at each sample interval and compared with the initial activity of the freshly prepared solutions, expressed as a per cent survival figure for each sample.

TABLE: STABILITY DATA, PER CENT SURVIVAL

| Temperature | 1 | 3 | Months 4 | 6 | 8 | 12 | 18 |
|---|---|---|---|---|---|---|---|
| 60° C | A | 0 | | | | | |

| | | | | | | | |
|---|---|---|---|---|---|---|---|
| | B | 98 | 96 | 90 | | | |
| 45° C | A | 30 | 30 | | | | |
| | B | 100 | 100 | 99 | 98.5 | 98 96.6 | 94 |
| 37° C | A | 60 | 30 | 2 | 0 | | |
| | B | 100 | 100 | 100 | 100 | 100 99 | 97 |

A: Cocarboxylase
B: Cocarboxylase arginate

In addition to the greatly improved stability shown above, cocarboxylase arginate has excellent pharmaceutical properties. As one example thereof, the cocarboxylase activity is greatly enhanced in cocarboxylase arginate, which is on the order of ten times as effective as cocarboxylase.

Furthermore, excellent clinical therapeutic results have been obtained with cocarboxylase arginate, even for conditions in which cocarboxylase and activated Vitamin $B_1$ treatment had no recognizable effect, such as in treatment of the sequelae of external head wounds, whiplash injuries, certain hearing difficulties, acute or chronic hepatitis, apoplexy, and post-operative intestinal paralysis.

It will be appreciated that while the foregoing disclosure is specifically directed to the preparation and use of cocarboxylase arginate, it is capable of numerous modifications and alterations thereof, with respect to the preparation of cocarboxylase arginate and its clinical use. Accordingly, numerous modifications or alterations may be made by those skilled in the art without departing from the spirit and scope of the present invention as set forth in the appended claims.

What is claimed and desired to be secured by letters patent of the United States is:

1. Cocarboxylase arginate.

* * * * *